(12) United States Patent
Ichiguchi et al.

(10) Patent No.: US 11,511,322 B2
(45) Date of Patent: Nov. 29, 2022

(54) CLEANING DEVICE AND IMAGING UNIT INCLUDING THE SAME

(71) Applicant: Murata Manufacturing Co., Ltd., Nagaokakyo (JP)

(72) Inventors: Shinichiro Ichiguchi, Nagaokakyo (JP); Katsumi Fujimoto, Nagaokakyo (JP); Chikahiro Horiguchi, Nagaokakyo (JP); Kenji Nishiyama, Nagaokakyo (JP); Yasuhiro Kuratani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 615 days.

(21) Appl. No.: 16/598,177

(22) Filed: Oct. 10, 2019

(65) Prior Publication Data

US 2020/0039475 A1 Feb. 6, 2020

Related U.S. Application Data

(63) Continuation of application No. PCT/JP2018/003381, filed on Feb. 1, 2018.

(30) Foreign Application Priority Data

Apr. 24, 2017 (JP) .............................. JP2017-085290

(51) Int. Cl.
*B60S 1/56* (2006.01)
*B08B 3/12* (2006.01)
(Continued)

(52) U.S. Cl.
CPC ............ *B08B 3/12* (2013.01); *G02B 27/0006* (2013.01); *H04N 5/2171* (2013.01); *B60S 1/46* (2013.01); *B60S 1/56* (2013.01)

(58) Field of Classification Search
CPC .... B08B 3/12; G02B 27/0006; H04N 5/2171; B60S 1/46; B60S 1/56
(Continued)

(56) References Cited

U.S. PATENT DOCUMENTS

2004/0047625 A1 3/2004 Ito et al.
2011/0073142 A1 3/2011 Hattori et al.
(Continued)

FOREIGN PATENT DOCUMENTS

CN 104369720 A 2/2015
CN 2017/022382 A1 2/2017
(Continued)

OTHER PUBLICATIONS

DE4217559A1—machine translation (Year: 1993).*
(Continued)

*Primary Examiner* — Tinsae B Ayalew
(74) *Attorney, Agent, or Firm* — Keating & Bennett, LLP

(57) ABSTRACT

A cleaning device for an imaging unit includes a housing that holds an imaging section, a protection cover provided in the visual field of the imaging section, a vibrator section that vibrates the protection cover, and a cleaning nozzle that discharges a cleaning liquid. The cleaning liquid discharged by the discharge section reaches a surface of side of the protection cover that is opposite to the side thereof adjacent to or in a vicinity of the imaging section. According to the vibrator section vibrating the protection cover, a portion of surface of the protection cover exhibits an amount of displacement larger than that of a portion of surface of the protection cover that the discharged cleaning liquid has reached.

20 Claims, 6 Drawing Sheets

(51) Int. Cl.
*G02B 27/00* (2006.01)
*H04N 5/217* (2011.01)
*B60S 1/46* (2006.01)

(58) Field of Classification Search
USPC .......................................................... 359/509
See application file for complete search history.

(56) References Cited

U.S. PATENT DOCUMENTS

| | | |
|---|---|---|
| 2012/0057066 A1 | 3/2012 | Kawai |
| 2012/0243093 A1 | 9/2012 | Tonar et al. |
| 2014/0299748 A1 | 10/2014 | Koops et al. |
| 2015/0040953 A1 | 2/2015 | Kikuta et al. |
| 2017/0036647 A1* | 2/2017 | Zhao ........................ B05B 1/04 |
| 2018/0095272 A1 | 4/2018 | Fujimoto et al. |

FOREIGN PATENT DOCUMENTS

| | | | |
|---|---|---|---|
| DE | 42 17 559 A1 | 12/1993 | |
| DE | 102014116681 A1 * | 5/2016 | ............... B60S 1/56 |
| JP | 57-175342 A | 10/1982 | |
| JP | 2011-125815 A | 6/2011 | |
| JP | 2011-240910 A | 12/2011 | |
| JP | 2012-138768 A | 7/2012 | |
| JP | 2015-057338 A | 3/2015 | |

OTHER PUBLICATIONS

WO2017022382A1—machine translation (Year: 2017).*
DE102014116681A1—machine translation (Year: 2014).*
Official Communication issued in corresponding European Application No. 18790106.1, dated Nov. 26, 2020.
Official Communication issued in International Patent Application No. PCT/JP2018/003381, dated May 1, 2018.

* cited by examiner

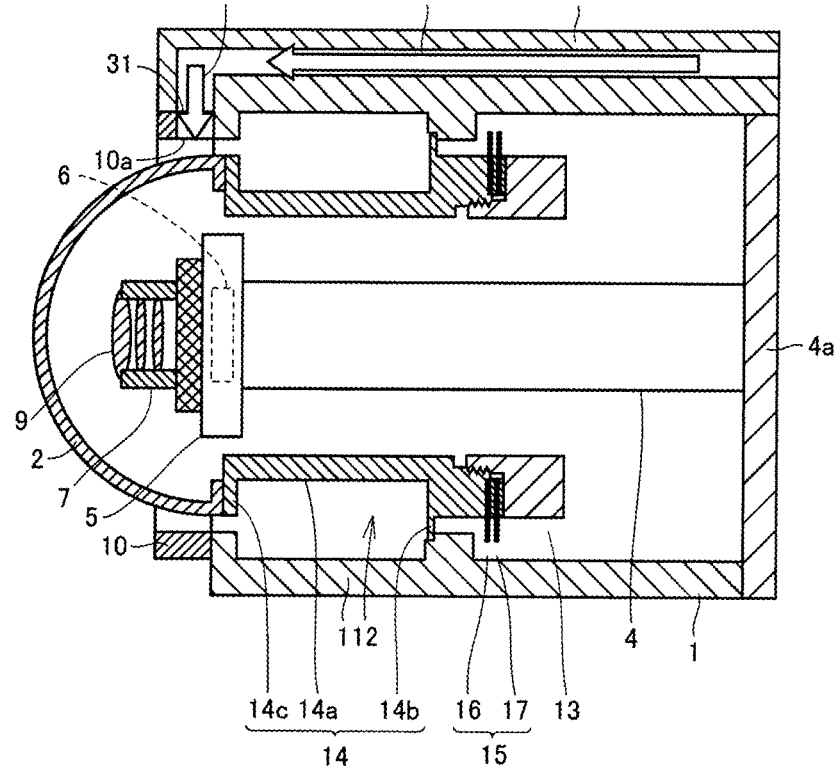
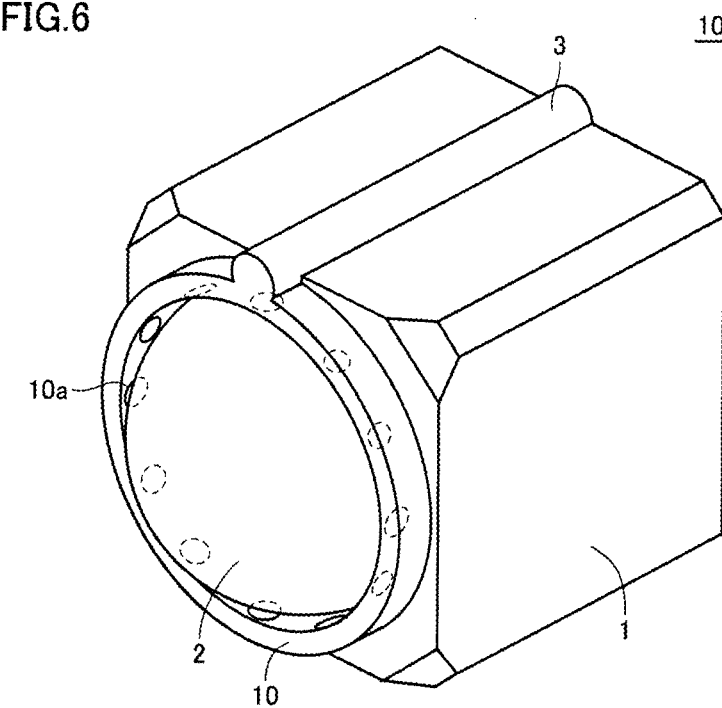

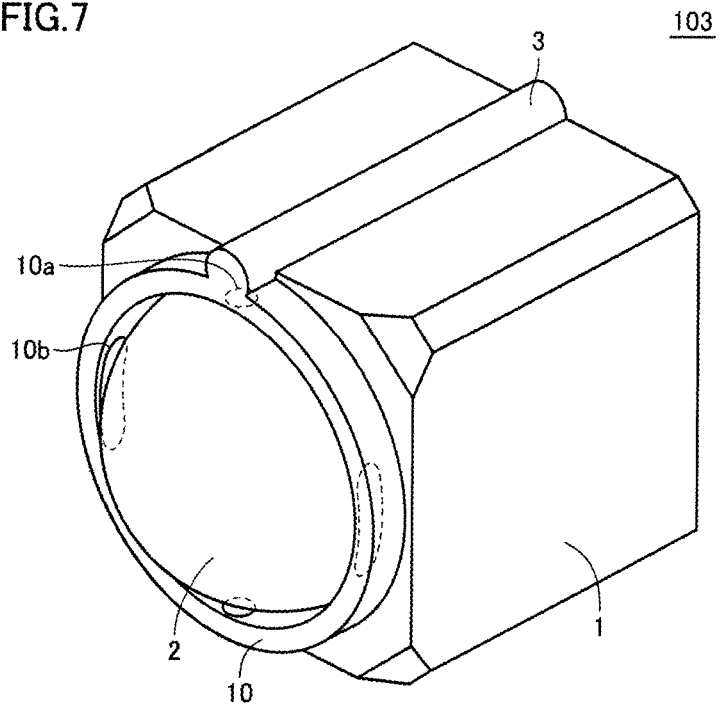
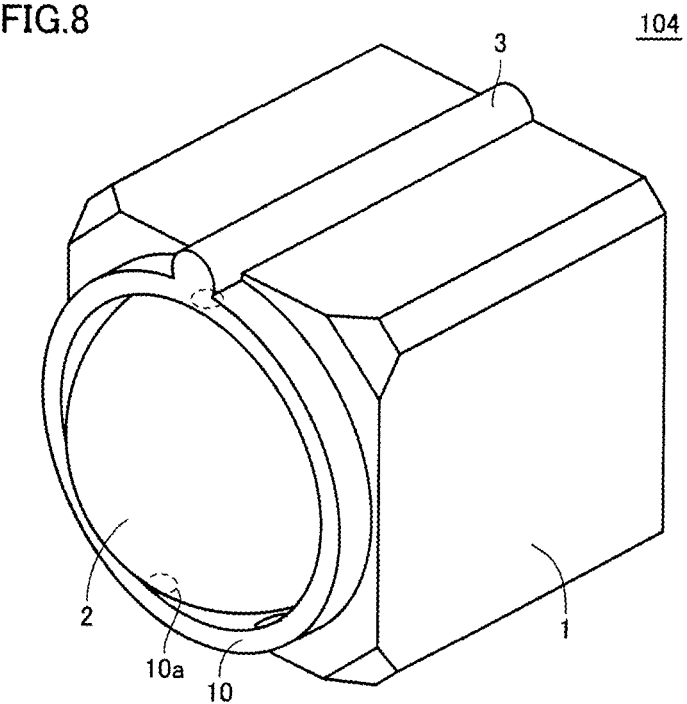

CLEANING DEVICE AND IMAGING UNIT INCLUDING THE SAME

CROSS REFERENCE TO RELATED APPLICATIONS

This application claims the benefit of priority to Japanese Patent Application No. 2017-085290 filed on Apr. 24, 2017 and is a Continuation Application of PCT Application No. PCT/JP2018/003381 filed on Feb. 1, 2018. The entire contents of each application are hereby incorporated herein by reference.

BACKGROUND OF THE INVENTION

1. Field of the Invention

The present invention relates to a cleaning device and to an imaging unit equipped with the cleaning device.

2. Description of the Related Art

It is a common practice to mount an imaging unit on the front side or the rear side of a vehicle and to utilize images captured by the imaging unit for navigation. The imaging unit is mounted on the exterior of the vehicle, and extraneous matter, such as rain drops, dirt, dust, or the like, often adheres to a light-transmissive member (i.e., a lens or a cover glass) that covers the imaging unit. In the case of the extraneous matter adhering to the front surface of the imaging unit, the extraneous matter adhered to the imaging unit appears in captured images, which makes the captured images unclear. To address this problem, an imaging unit equipped with a cleaning device that discharges a cleaning liquid to the surface of the light-transmissive member has been developed. In particular, Japanese Unexamined Patent Application Publication No. 2015-057338 discloses an imaging unit equipped with such a cleaning device.

The cleaning device according to Japanese Unexamined Patent Application Publication No. 2015-057338 cleans the surface of a light-transmissive member by moving a nozzle that has a cavity for discharging a cleaning liquid. The cleaning device moves the nozzle between a cleaning position near the center of the imaging range and a non-cleaning position away from the center of the imaging range. However, the cleaning device described in Japanese Unexamined Patent Application Publication No. 2015-057338, which employs the nozzle that moves during cleaning, tends to be structurally complicated and to lead to a reliability problem, such as vulnerability to malfunction. In addition, in the cleaning device according to Japanese Unexamined Patent Application Publication No. 2015-057338, failure to move the nozzle to the cleaning position leads to unsatisfactory cleaning results.

SUMMARY OF THE INVENTION

Preferred embodiments of the present invention provide reliable cleaning devices and imaging units equipped with the cleaning devices.

A cleaning device according to a preferred embodiment of the present invention includes a holder section that holds an imaging device, a light-transmissive member provided in a visual field of the imaging device, a vibrator section that vibrates the light-transmissive member, and a discharge section that discharges a cleaning liquid. The cleaning liquid discharged by the discharge section reaches a surface of a side of the light-transmissive member that is opposite to a side thereof adjacent to or in a vicinity of the imaging device. In the cleaning device, according to the vibrator section vibrating the light-transmissive member, a portion of the surface of the light-transmissive member exhibits an amount of displacement larger than that of a portion of the surface of the light-transmissive member that the discharged cleaning liquid has reached.

An imaging unit according to a preferred embodiment of the present invention includes the cleaning device.

According to the preferred embodiments of the present invention, due to the vibrator section vibrating the light-transmissive member, a portion of the surface of the light-transmissive member exhibits an amount of displacement larger than that of a portion of the surface thereof that the discharged cleaning liquid has reached. The cleaning liquid is thus moved on the surface of the light-transmissive member to clean the light-transmissive member. Therefore, reliable cleaning devices that are each able to provide satisfactory cleaning results are obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a cross-sectional view of the imaging unit according to the second preferred embodiment of the present invention.

FIG. 6 is a perspective view of an imaging unit according to a third preferred embodiment of the present invention.

FIG. 7 is a perspective view of an imaging unit according to a modified example of the third preferred embodiment of the present invention.

FIG. 8 is a perspective view of an imaging unit according to a fourth preferred embodiment of the present invention.

DETAILED DESCRIPTION OF THE PREFERRED EMBODIMENTS

Figure 1:
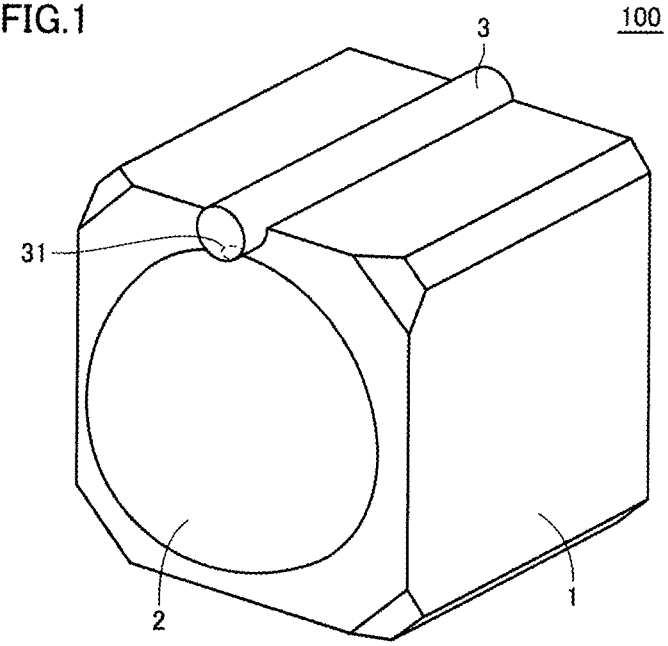
FIG. 1 is a perspective view of an imaging unit according to a first preferred embodiment of the present invention.

Imaging units according to preferred embodiments of the present invention will be described in detail with reference to the drawings. In the drawings, the same reference symbols denote the same or similar elements.

First Preferred Embodiment

Figure 2:
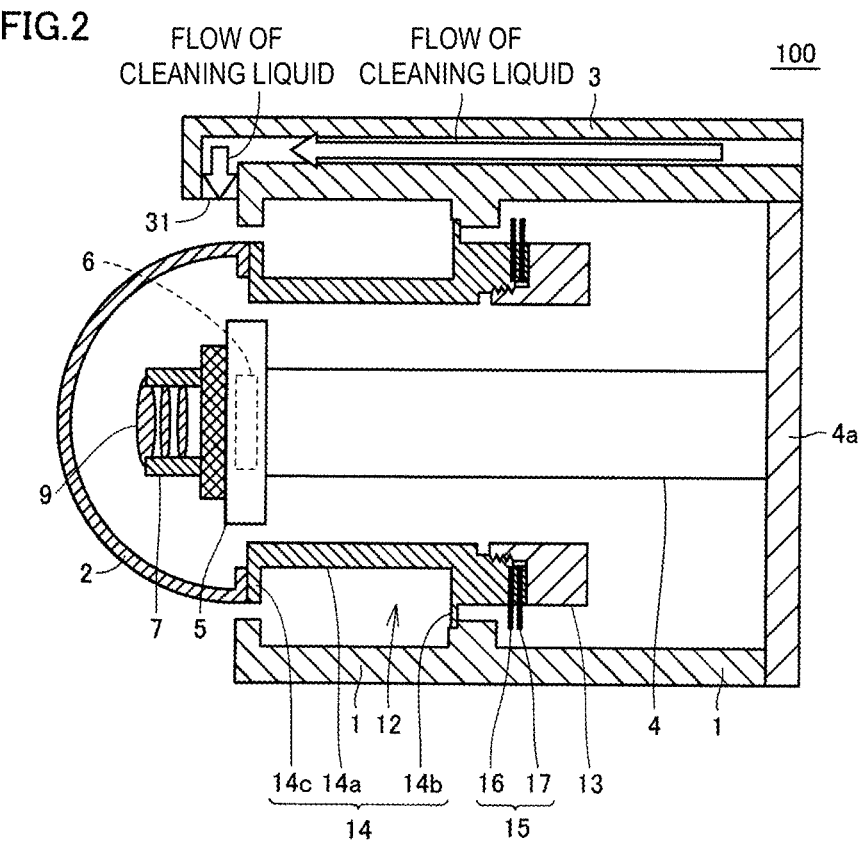
FIG. 2 is a cross-sectional view of the imaging unit according to the first preferred embodiment of the present invention.

An imaging unit according to a first preferred embodiment of the present invention will be described with reference to the drawings. FIG. 1 is a perspective view of an imaging unit 100 according to the first preferred embodiment of the present invention. FIG. 2 is a cross-sectional view of the imaging unit 100 according to the first preferred embodiment of the present invention. The imaging unit 100 includes a housing 1, a light-transmissive protection cover 2 located on one side of the housing 1, a cleaning nozzle 3 including a cavity 31 that discharges a cleaning liquid to the protection cover 2, a vibrator section 12 that vibrates the protection cover 2, and an imaging section 5 located inside the protection cover 2. Note that a portion of the imaging unit 100 excluding the imaging section 5, in other words, a portion of the imaging unit 100 including the housing 1, the protection cover 2, the cleaning nozzle 3, and the vibrator section 12, defines a cleaning device that cleans off extraneous matter (deposits) that adheres to the imaging section 5 in the imaging range thereof.

As shown in FIG. 2, the imaging section 5 is supported by a cylindrically shaped body member 4 and thus fixed to a base plate 4a. The base plate 4a is fixed to a portion of the housing 1. Accordingly, the housing 1 defines and functions as a holder section that holds the imaging section 5 via the body member 4 and base plate 4a. Note that the holder section is not limited to the specific features shown in FIG. 2 insofar as the holder section is able to hold the imaging section 5.

The imaging section 5 includes therein a circuit 6 with an imaging device. A lens module 7 is fixed at a position in the image-shooting direction of the imaging section 5. The lens module 7 preferably has a cylindrical shape and includes multiple lenses 9 provided therein. Note that the structure of the imaging section 5 is not specifically limited insofar as the imaging section 5 is able to image an object in front of the lenses 9.

The housing 1 preferably has a square or substantially square tube shape and is preferably made of, for example, a metal or a synthetic resin. Note that the housing 1 may have shapes, such as a cylindrical shape. The base plate 4a is fixed to one end of the housing 1, and the protection cover 2 and the vibrator section 12 are located adjacent to or in a vicinity of the other end of the housing 1.

The vibrator section 12 also preferably has a cylindrical shape. The vibrator section 12 includes a cylindrically shaped first cylindrical member 13, a cylindrically shaped second cylindrical member 14, and a cylindrically shaped piezoelectric vibrator 15. The piezoelectric vibrator 15 includes two cylindrically shaped piezoelectric plates 16 and 17. The polarization direction of the piezoelectric plate 16 is opposite to the polarization direction of the piezoelectric plate 17.

The vibrator section and the piezoelectric vibrator may have a square or substantially square tube shape, instead of a cylinder shape. It is preferable, for example, to use the vibrator section and the piezoelectric vibrator that have cylindrical shapes, in other words, shaped as rings.

The piezoelectric plates 16 and 17 are preferably made of PZT-based piezoelectric ceramics, for example. Note that other type of ceramics, such as $(K, Na)NbO_3$, for example, may be used. A single crystal piezoelectric material, such as $LiTaO_3$, for example, may also be used.

Electrodes (not shown) are provided on both sides of each of the piezoelectric plates 16 and 17. Each of the electrodes preferably includes a laminated structure of, for example, Ag/NiCu/NiCr.

The cylindrically shaped first cylindrical member 13 is fixed to the bottom surface of the piezoelectric vibrator 15.

The first cylindrical member 13 is preferably made of a metal. Duralumin, stainless steel, or kovar, for example, may be used as the metal. Alternatively, the first cylindrical member 13 may be made of a semiconductor such as Si having electric conductivity.

The piezoelectric vibrator 15 is sandwiched between a portion of the first cylindrical member 13 and a portion of the second cylindrical member 14. Both of the first cylindrical member 13 and the second cylindrical member 14 are preferably made of a metal and have electric conductivity. The piezoelectric vibrator 15 is able to vibrate longitudinally or transversally by applying an alternating electric field to respective electrodes of the piezoelectric plates 16 and 17. A female thread is provided on a portion of inner peripheral surface of the second cylindrical member 14. The first cylindrical member 13 is thus screwed in, and fixed to, the second cylindrical member 14. A portion of the first cylindrical member 13 and a portion of the second cylindrical member 14 are thus pressed onto the bottom surface and the top surface of the piezoelectric vibrator 15.

Accordingly, the vibration generated by the piezoelectric vibrator 15 vibrates the entire vibrator section 12 efficiently. In the first preferred embodiment, the vibrator section 12 is vibrated efficiently by the longitudinal effect and the transversal effect.

In addition, the second cylindrical member 14 includes a flange portion 14b that protrudes circumferentially outward. The flange portion 14b is provided in the cavity of the housing 1 and fixed thereto.

A flange portion 14c is also provided at an end of the second cylindrical member 14 and protrudes circumferentially outward. A portion of the second cylindrical member 14 that continues to both of the flange portion 14b and the flange portion 14c is a thin-wall portion 14a. The thickness of the thin-wall portion 14a is thinner than the thickness of the first cylindrical member 13. Accordingly, the cylindrically shaped thin-wall portion 14a displaces primarily due to vibration of the vibrator section 12. The thin-wall portion 14a strengthens the vibration, in particular, by increasing an amplitude of the vibration.

The protection cover 2 is fixed to the flange portion 14c. The protection cover 2 defines and functions as a light-transmissive member that transmits light from an imaging object. The protection cover 2 includes an opening that opens in one direction. A portion of the protection cover 2 that defines the opening is joined to the flange portion 14c. The portion is preferably joined by an adhesive or a soldering material. Alternatively, thermo-compression bonding or anodic bonding may be included.

The protection cover 2 preferably has a dome shape that rises from the portion joined to the flange portion 14c. In the first preferred embodiment, the dome is preferably shaped as a hemisphere. Note that the imaging section 5 preferably has a viewing angle of, for example, 170 degrees. However, the dome shape is not specifically limited to a hemisphere. The dome may be defined by a combination of a hemisphere and a cylinder or as a shape with a curved surface shallower than a hemisphere. The entire protection cover 2 has light transmissivity. In the first preferred embodiment, the protection cover 2 is preferably made of glass, for example. However, the protection cover 2 is not specifically limited to glass and may be made of a transparent plastic, for example. Alternatively, the protection cover 2 may be made of transparent ceramics, for example. It may be preferable to use tempered glass in some applications. This increases the strength of the cover. In addition, in the case of glass, a coating layer, such as DLC, may be provided on the surface in order to increase the strength.

The lens module 7 and the imaging section 5 described above are located inside the protection cover 2. Images of an external object are captured through the protection cover 2.

The cleaning nozzle 3 is provided in the housing 1. The cleaning nozzle 3 includes the cavity 31 through which a cleaning liquid is discharged to the protection cover 2. The cleaning nozzle 3 preferably as a tube shape, and the cleaning liquid is supplied to an end of the tube opposite to the end at which the cavity 31 is provided. The cleaning liquid is discharged from the cavity 31 to an end portion of the protection cover 2. The tip of the cleaning nozzle 3 is positioned outside the imaging range (visual field) of the imaging section 5, and accordingly the cavity 31 is positioned so as not to appear in an image captured by the imaging section 5. In FIG. 2, flow of the cleaning liquid is indicated by arrows. The cleaning nozzle 3 defines and functions as a discharge section that discharges the cleaning liquid. In the first preferred embodiment, the housing 1 includes a single cleaning nozzle 3. However, the housing 1 may include multiple cleaning nozzles 3.

The following describes the operation of the cleaning device provided on the imaging unit 100 (hereinafter simply called "cleaning device") that cleans off extraneous matter adhered to the protection cover 2.

In the case of the imaging unit 100 being mounted, for example, on the front side of a vehicle, extraneous matter, such as rain drops, dirt, dust, may adhere to the surface of the protection cover 2. In order to clean the extraneous matter off, the cleaning device discharges a cleaning liquid to the protection cover 2 from the cavity 31 of the cleaning nozzle 3 and the vibrator section 12 vibrates the protection cover 2.

The cleaning device does not simply clean the surface of the protection cover 2 by discharging the cleaning liquid from the cavity 31 of the cleaning nozzle 3. The cleaning device cleans the surface of the protection cover 2 by vibrating the protection cover 2 and thus moving the cleaning liquid discharged thereon along the surface of the protection cover 2. Accordingly, the cleaning device does not only clean an area onto which the cleaning liquid is discharged but also clean liquid tracks on which the cleaning liquid moves. Moreover, the cleaning device vibrates the protection cover 2, which readily removes the extraneous matter adhered to the surface of the protection cover 2.

Figure 3:
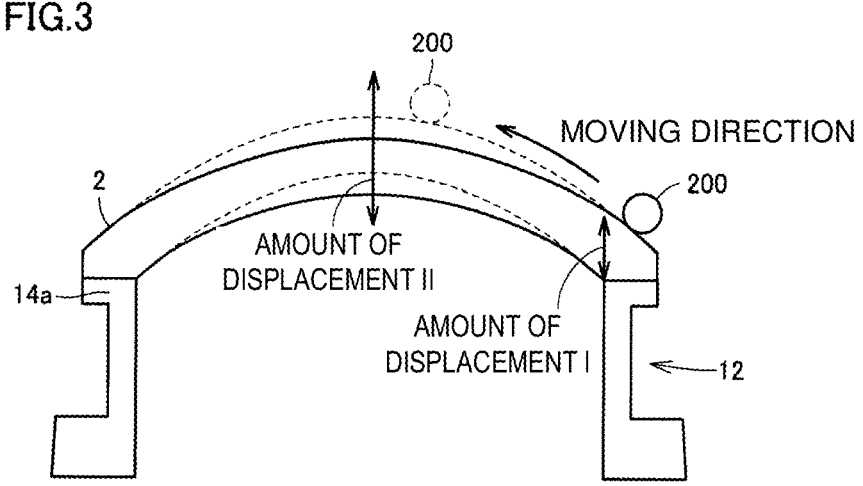
FIG. 3 is a cross-sectional view illustrating the amount of displacement of a protection cover according to the first preferred embodiment of the present invention.

Vibrating the protection cover 2 moves the cleaning liquid discharged onto the surface of the protection cover 2 because the amount of displacement of the protection cover 2 becomes different between positions on the surface of the protection cover 2. In other words, the vibrator section 12 vibrates the protection cover 2 to generate a portion of the surface of the protection cover 2 that exhibits an amount of displacement larger than that of a portion of the surface of the protection cover 2 that the discharged cleaning liquid has reached. FIG. 3 is a cross-sectional view showing the amount of displacement of the protection cover according to the first preferred embodiment. As indicated by the dotted lines in FIG. 3, when the protection cover 2 is vibrated, an amount of displacement II, which is the displacement of center portion of the protection cover 2, becomes larger than an amount of displacement I, which is the displacement of end portion of the protection cover 2 that is joined to the flange portion 14*c*.

When the amount of displacement becomes different between the end portion of the protection cover 2 and the center portion of the protection cover 2, a cleaning liquid 200 that has been discharged to the edge portion of the protection cover 2 moves toward the center portion of the protection cover 2 that displaces more as shown in FIG. 3. The imaging unit 100 moves the cleaning liquid 200 toward the center portion of the protection cover 2, which is able to clean the surface of the protection cover 2 along liquid tracks on which the cleaning liquid 200 moves and remove the extraneous matter adhered thereto. The cleaning liquid 200 that has reached the center portion of the protection cover 2 is atomized at the center portion that is subjected to a larger displacement. The cleaning liquid 200 disappears together with the extraneous matter that has been present on the surface of the protection cover 2.

FIG. 3 shows an example of a vibration mode of the protection cover 2 in which the end portion of the protection cover 2 exhibits a small amount of displacement and the center portion thereof exhibits a large amount of displacement. However, the vibration mode is not limited to this example. It is sufficient that the vibration mode of the protection cover 2 at least varies the amount of displacement at different positions on the surface of the protection cover 2.

Note that by changing the vibration mode of the protection cover 2, the vibrator section 12 is able to vibrate the protection cover 2, and the protection cover 2 exhibits a maximum or substantially maximum amount of displacement at a position other than the center of the protection cover 2. In addition, depending on the conditions, such as the weight and size of the cleaning liquid, the vibrator section 12 is able to move and atomize the cleaning liquid by vibrating the protection cover 2 with an amount of displacement of about 1 μm or more, for example, at a position on the surface of the protection cover 2 at which the protection cover 2 exhibits the maximum or substantially maximum amount of displacement.

Note that the vibrator section 12 is able to vibrate the protection cover 2 in a respiratory vibration mode and in a longitudinal vibration mode by applying an alternating electric field to the piezoelectric vibrator 15. Moreover, modifying the structure of the vibrator section 12 or controlling the electric field applied to the piezoelectric vibrator 15 enables the vibrator section 12 to vibrate the protection cover 2 in other vibration modes.

As shown in FIG. 1, the cleaning nozzle 3 is located on the top side of the housing 1 and discharges the cleaning liquid to an upper end of the protection cover 2. The cleaning liquid discharged onto the upper end of the protection cover 2 flows along the edge of the protection cover 2 and reaches a lower end thereof. When the vibrator section 12 vibrates the protection cover 2, the cleaning liquid having reached the edge of the protection cover 2 also moves toward the center portion thereof. Accordingly, the cleaning device is able to clean the entire or substantially the entire surface of the protection cover 2. Here, "a portion of surface of the protection cover 2 that the discharged cleaning liquid reaches" refers to a portion of surface of the protection cover 2 that the cleaning liquid discharged from the cavity 31 of the cleaning nozzle 3 directly reaches. In addition, it also refers to a portion of surface of the protection cover 2 that the cleaning liquid indirectly reaches. This also includes a case in which the cleaning liquid discharged from the cleaning nozzle 3 reaches the housing 1 first, instead of reaching the surface of the protection cover 2 directly, and subsequently moves to the surface of the protection cover 2.

As described, the imaging unit 100 according to the first preferred embodiment includes the cleaning device. The cleaning device includes the housing 1 that holds the imaging section 5, the protection cover 2 provided in the visual field of the imaging section 5, the vibrator section 12 that vibrates the protection cover 2, and the cleaning nozzle 3 that discharges the cleaning liquid to enable the cleaning liquid to reach a surface of side of the protection cover 2 that is opposite to the side adjacent to or in a vicinity of the imaging section 5. The vibrator section 12 vibrates the protection cover 2 to generate a portion of surface of the protection cover 2 that exhibits an amount of displacement larger than that of the portion of surface thereof that the discharged cleaning liquid has reached.

In the imaging unit 100, the cleaning device is able to move the cleaning liquid discharged onto the protection cover 2 to a position where the displacement is large, thus cleaning the surface of the protection cover 2 along the liquid tracks on which the cleaning liquid moves and atomizing the cleaning liquid at a position at which a maximum or substantially maximum displacement is exhibited. In addition, the vibrator section 12 vibrates the protection cover 2, which readily removes dirt adhered to the surface of the protection cover 2. The cleaning efficiency of the cleaning device is thus significantly improved, which is able to reduce the amount of the cleaning liquid to be used and also is able to reduce the size of a tank that stores the cleaning liquid.

Moreover, the cleaning device is able to move the cleaning liquid discharged on the surface of the protection cover 2, which eliminates the necessity of including a movable cleaning nozzle 3 that moves to discharge the cleaning liquid to predetermined positions. Accordingly, the reliability of the cleaning device is able to be significantly improved.

In addition, the cleaning nozzle 3 includes the cavity 31 that discharges the cleaning liquid located at a position out of the imaging range (visual field) of the imaging section 5. Accordingly, the cavity 31 does not hamper the imaging section 5 from capturing images.

Second Preferred Embodiment

In the imaging unit 100 according to the first preferred embodiment, the cleaning liquid discharged onto an upper end of the protection cover 2 is allowed to flow along the edge of the protection cover 2 to reach the lower end thereof. On the other hand, an imaging unit according to a second preferred embodiment of the present invention includes a guide portion provided along the periphery of the protection cover, which helps cleaning liquid discharged from the cleaning nozzle to reach the lower end of the protection cover.

Figure 4:
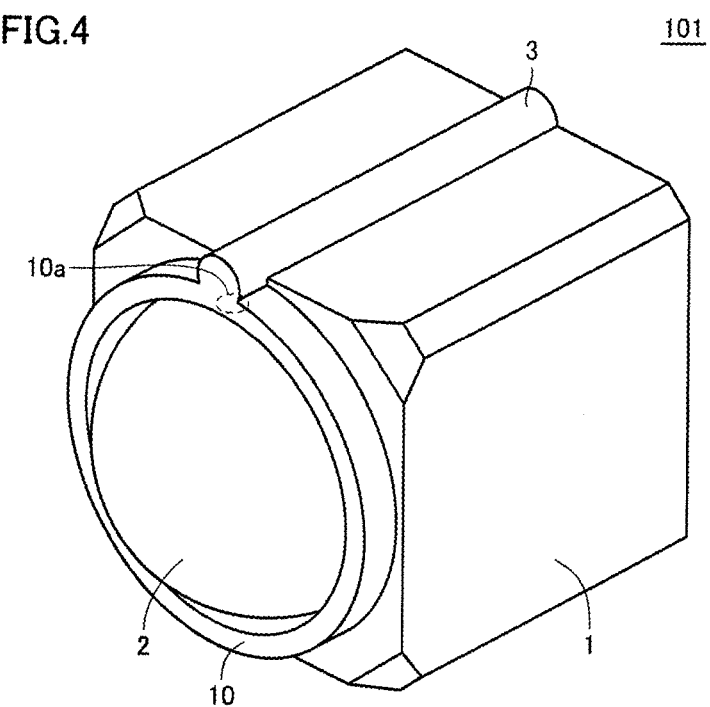
FIG. 4 is a perspective view of an imaging unit according to a second preferred embodiment of the present invention.

FIG. 4 is a perspective view of an imaging unit 101 according to the second preferred embodiment of the present invention. FIG. 5 is a cross-sectional view of the imaging unit 101 according to the second preferred embodiment of the present invention. Note that in the imaging unit 101 shown in FIGS. 4 and 5, elements the same as or similar to those of the imaging unit 100 shown in FIGS. 1 and 2 are denoted by the same reference symbols, and detailed descriptions thereof will be omitted.

The imaging unit 101 includes a guide portion 10 along the periphery of the protection cover 2. The guide portion 10 is an annularly shaped component and is fixed to the housing 1. The height (i.e., the width in the image-shooting direction) of the guide portion 10 is such that the guide portion 10 does not appear in the imaging range of the imaging section 5. The cavity 10*a* is provided in the inner circumferential surface of the guide portion 10. The cavity 10*a* is connected to the cavity 31 of the cleaning nozzle 3 and discharges cleaning liquid supplied from the cleaning nozzle 3.

The cleaning liquid discharged from the cavity 10*a* flows along the inner circumferential surface of the guide portion 10 and reaches the lower end of the protection cover 2. In the cleaning device, when the vibrator section 12 vibrates the protection cover 2, the cleaning liquid having reached the inner circumferential surface of the guide portion 10 moves toward the center of the protection cover 2, which is able to clean the entire or substantially the entire surface of the protection cover 2.

As described, in the imaging unit 101 according to the second preferred embodiment, the protection cover 2 includes the guide portion 10 provided along the periphery thereof, and the guide portion 10 includes the cavity 10*a* included therein. Thus, the cleaning liquid is able to be discharged from the cavity 10*a* to flow reliably to the lower end of the protection cover 2 along the inner circumferential surface of the guide portion 10, and thus the cleaning device is able to clean the entire or substantially the entire surface of the protection cover 2.

Third Preferred Embodiment

The imaging unit 101 according to the second preferred embodiment includes a single cavity 10*a* provided in the guide portion 10. On the other hand, an imaging unit according to a third preferred embodiment of the present invention includes multiple cavities provided in the guide portion.

FIG. 6 is a perspective view of an imaging unit 102 according to the third preferred embodiment of the present invention. Note that in the imaging unit 102 shown in FIG. 6, elements the same as or similar to those of the imaging unit 100 shown in FIG. 1 and of imaging unit 101 shown in FIG. 4 are denoted by the same reference symbols, and detailed descriptions thereof will be omitted.

The imaging unit 102 includes the guide portion 10 along the periphery of the protection cover 2. The guide portion 10 is an annularly shaped component that is fixed to the housing 1 and is connected to the cleaning nozzle 3. The tube-shaped guide portion 10 enables the cleaning liquid to flow therethrough. The multiple cavities 10*a* are provided in the inner circumferential surface of the guide portion 10. The cleaning liquid is supplied to the cavities 10*a* from the cleaning nozzle 3 through the guide portion 10. Accordingly, the cleaning device is able to discharge the cleaning liquid from the multiple cavities 10*a* provided in the guide portion 10 simply by supplying the cleaning liquid from the cleaning nozzle 3.

As shown in FIG. 6, the cavities 10*a* are preferably equidistant or substantially equidistant with each other around the protection cover 2. In addition, one cavity 10*a* and a corresponding another cavity 10*a* oppose each other with respect to the center of the protection cover 2. In other words, a cavity 10*a* provided at the upper end of the protection cover 2 opposes a cavity 10*a* provided at the lower end of the protection cover 2 with respect to the center of the protection cover 2. Thus, the cleaning device is able to discharge the cleaning liquid uniformly or substantially uniformly to the edge of the protection cover 2.

The cleaning liquid is discharged uniformly or substantially uniformly to the edge of the protection cover 2 from multiple cavities 10*a*. Thus, in the cleaning device, when the vibrator section 12 vibrates the protection cover 2, the cleaning liquid discharged uniformly or substantially uniformly to the edge of the guide portion 10 moves toward the center of the protection cover 2, which is able to clean the entire or substantially the entire surface of the protection cover 2.

As described above, in the imaging unit 102 according to the third preferred embodiment, the multiple cavities 10a are provided in the inner circumferential surface of the guide portion 10 and are equidistant or substantially equidistant with each other around the protection cover 2, which enables the cleaning liquid discharged uniformly or substantially uniformly to the edge of the protection cover 2 to clean the entire surface of the protection cover 2.

Moreover, in the imaging unit 102 according to the third preferred embodiment, the multiple cavities 10a are provided in the inner circumferential surface of the guide portion 10, and one cavity 10a opposes a corresponding another cavity 10a with respect to the center of the protection cover 2. Accordingly, the cleaning liquid is able to be uniformly or substantially uniformly discharged to the edge of the protection cover 2 to clean the entire surface of the protection cover 2.

MODIFIED EXAMPLE

The cavities 10a shown in FIG. 6 include openings that are shaped equally or substantially equally. However, the shape of the opening may be changed depending on the position of the cavity 10a provided in the guide portion 10. FIG. 7 is a perspective view of an imaging unit 103 according to a modified example of the third preferred embodiment of the present invention. Note that in the imaging unit 103 shown in FIG. 7, elements the same as or similar to those of the imaging unit 100 shown in FIG. 1 and of the imaging unit 101 shown in FIG. 4 are denoted by the same reference symbols, and detailed descriptions thereof will be omitted.

The imaging unit 103 includes a guide portion 10 along the periphery of the protection cover 2. The guide portion 10 is an annularly shaped component that is fixed to the housing 1 and is connected to the cleaning nozzle 3. The tube-shaped guide portion 10 enables the cleaning liquid to flow therethrough. Cavities 10a including circularly shaped openings and cavities 10b including elongated openings are provided in the inner circumferential surface of the guide portion 10. Moreover, as shown in FIG. 7, the cavities 10a and the cavities 10b are equidistant or substantially equidistant along the periphery of the protection cover 2. A cavity 10a provided at the upper end of the protection cover 2 opposes a cavity 10a disposed at the lower end thereof with respect to the center of the protection cover 2, and a cavity 10b provided at the right end of the protection cover opposes a cavity 10b provided at the left end thereof with respect to the center of the protection cover 2.

As described above, the imaging unit 103 according to the modified example includes multiple cavities provided in the inner circumferential surface of the guide portion 10, and the multiple cavities further include the cavities 10a and 10b that include openings that are shaped differently. Accordingly, in view of the position at which the imaging unit 103 is mounted, the amount of cleaning liquid discharged from each cavity is able to be changed depending on the position of the cavity in the guide portion 10. As shown in FIG. 7, for example, the amount of the cleaning liquid discharged to the upper and lower ends of the protection cover 2 is decreased, and the amount of the cleaning liquid discharged to the right and left ends of the protection cover 2 is increased.

Fourth Preferred Embodiment

In the imaging unit 102 according to the third preferred embodiment, the cavities 10a are equidistant or substantially equidistant along the periphery of the protection cover 2. In an imaging unit according to a fourth preferred embodiment of the present invention, multiple cavities are provided in the guide portion and have different spacings between adjacent cavities.

FIG. 8 is a perspective view of an imaging unit 104 according to the fourth preferred embodiment of the present invention. Note that in the imaging unit 104 shown in FIG. 8, elements the same as or similar to those of the imaging unit 100 shown in FIG. 1 and of the imaging unit 101 shown in FIG. 4 are denoted by the same reference symbols, and detailed descriptions thereof will be omitted.

The imaging unit 104 includes the guide portion 10 along the periphery of the protection cover 2. The guide portion 10 is an annularly shaped component that is fixed to the housing 1 and is connected to the cleaning nozzle 3. The tube-shaped guide portion 10 enables the cleaning liquid to flow therethrough. Multiple cavities 10a are provided in the inner circumferential surface of the guide portion 10. A cleaning liquid is supplied to the cavities 10a from the cleaning nozzle 3 through the guide portion 10. Accordingly, the cleaning device is able to discharge the cleaning liquid from the multiple cavities 10a be provided in the guide portion 10 simply by supplying the cleaning liquid from the cleaning nozzle 3.

As shown in FIG. 8, the cavities 10a are provided along the periphery of the protection cover 2 to have different spacings between adjacent cavities. In other words, the distance between a cavity 10a provided at the upper end of the protection cover 2 and one of two cavities 10a provided at the lower end thereof is different from the distance between the two cavities 10a provided at the lower end.

As described above, in the imaging unit 104 according to the fourth preferred embodiment, multiple cavities 10a are provided in the inner circumferential surface of the guide portion 10 and are provided around the protection cover 2 to have different spacings between adjacent cavities 10a. Accordingly, in view of the position at which the imaging unit 104 is mounted, the amount of cleaning liquid discharged from each cavity is able to be changed depending on the position of the cavity in the guide portion 10. As shown in FIG. 8, for example, the amount of the cleaning liquid discharged to the upper end of the protection cover 2 is decreased, and the amount of the cleaning liquid discharged to the lower end of the protection cover 2 is increased.

Fifth Preferred Embodiment

A relationship between the optical axis of the imaging section 5 and the amount of displacement of the protection cover will be described in relation to an imaging unit according to a fifth preferred embodiment of the present invention.

Figure 9:
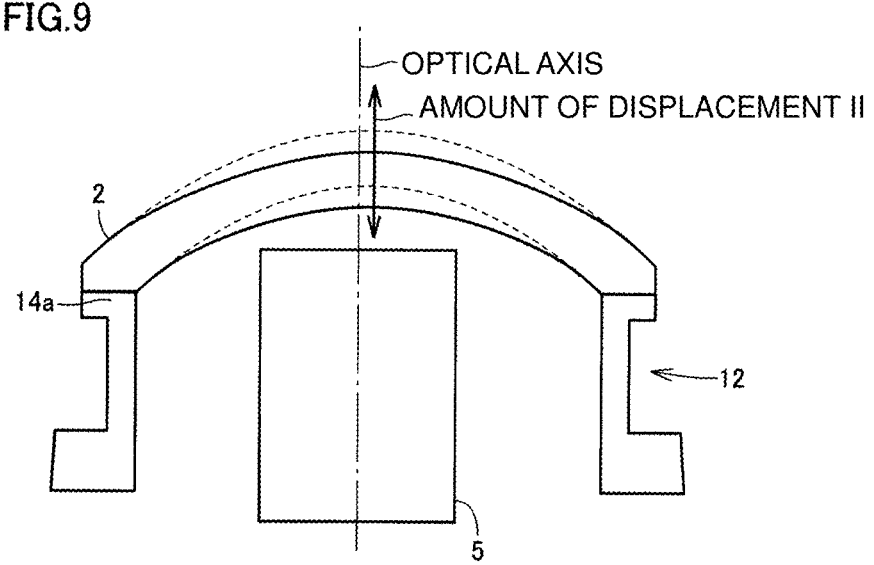
FIG. 9 is a cross-sectional view of an imaging unit according to a fifth preferred embodiment of the present invention.

FIG. 9 is a cross-sectional view of an imaging unit according to the fifth preferred embodiment of the present invention. Note that FIG. 9 only shows a portion of the protection cover 2, a portion of the imaging section 5, and a portion of the vibrator section 12 of the imaging unit for the convenience of explanation.

Note that in the imaging unit shown in FIG. 9, elements the same as or similar to those of the imaging unit 100 shown in FIG. 2 are denoted by the same reference symbols, and detailed descriptions thereof will be omitted.

In the imaging unit shown in FIG. 9, the housing holds the imaging section 5, and the optical axis of the imaging section 5 passes through the center portion of the protection cover 2 that exhibits the amount of displacement II, which is a maximum or substantially maximum displacement exhibited on the surface of the protection cover 2. Accordingly, the cleaning liquid discharged onto the protection cover 2 is gathered and then atomized at the center portion of the protection cover 2 that exhibits the amount of displacement II. In other words, the cleaning liquid is gathered and atomized at the center of imaging range of the imaging section 5 in the imaging unit shown in FIG. 9.

As described above, in the imaging unit according to the fifth preferred embodiment, the housing holds the imaging section 5, and the optical axis of the imaging section 5 passes through the portion of surface of the protection cover 2 that exhibits a maximum or substantially maximum amount of displacement (the amount of displacement II). Thus, the center of imaging range of the imaging section 5 is able to be cleaned reliably, and the imaging unit is able to capture images through the clean and clear protection cover 2.

Sixth Preferred Embodiment

In the imaging unit according to a sixth preferred embodiment of the present invention, the optical axis of the imaging section 5 passes through the portion of surface of the protection cover 2 that exhibits the maximum or substantially maximum amount of displacement. In the imaging unit according to the sixth preferred embodiment, the optical axis of the imaging section 5 passes through the portion of surface of the protection cover that does not exhibit a maximum or substantially maximum amount of displacement.

Figure 10:
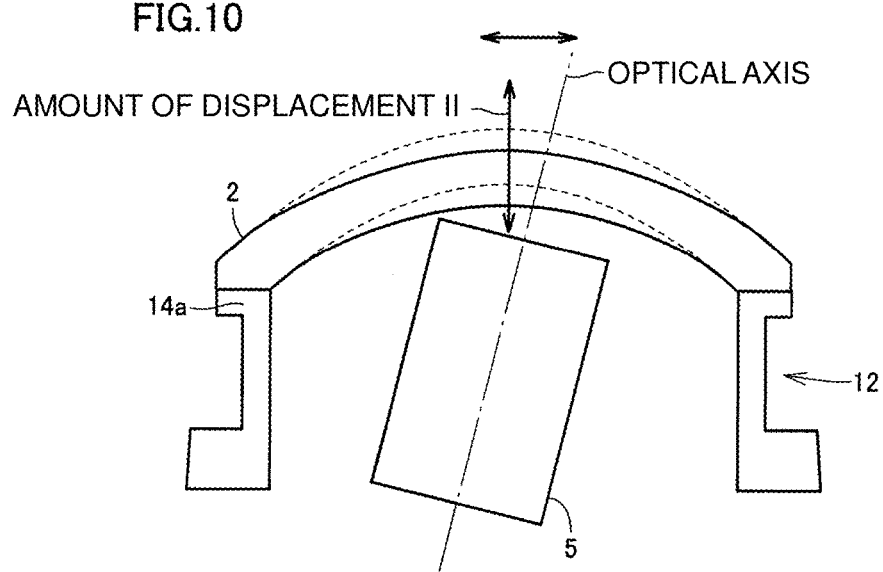
FIG. 10 is a cross-sectional view of an imaging unit according to a sixth preferred embodiment of the present invention.

FIG. 10 is a cross-sectional view of an imaging unit according to the sixth preferred embodiment of the present invention. Note that FIG. 10 only shows a portion of the protection cover 2, a portion of the imaging section 5, and a portion of the vibrator section 12 of the imaging unit for the convenience of explanation. Note that in the imaging unit shown in FIG. 10, elements the same as or similar to those of the imaging unit 100 shown in FIG. 2 are denoted by the same reference symbols, and detailed descriptions thereof will be omitted.

In the imaging unit shown in FIG. 10, the housing holds the imaging section 5, and the optical axis of the imaging section 5 passes through the center portion of the protection cover 2 that does not exhibit the amount of displacement II. Accordingly, the cleaning liquid discharged onto the protection cover 2 is gathered and then atomized at a portion of the protection cover 2 that is different from the center of imaging range of the imaging section 5.

As described above, in the imaging unit according to the sixth preferred embodiment, the housing holds the imaging section 5, and the optical axis of the imaging section 5 passes through the portion of surface of the protection cover 2 that does not exhibit a maximum or substantially maximum amount of displacement (the amount of displacement II). Thus, the imaging unit is able to capture images without being disturbed by a collected cleaning liquid or an atomized cleaning liquid even when the cleaning device is cleaning the protection cover 2.

OTHER MODIFIED EXAMPLES

Figure 11:
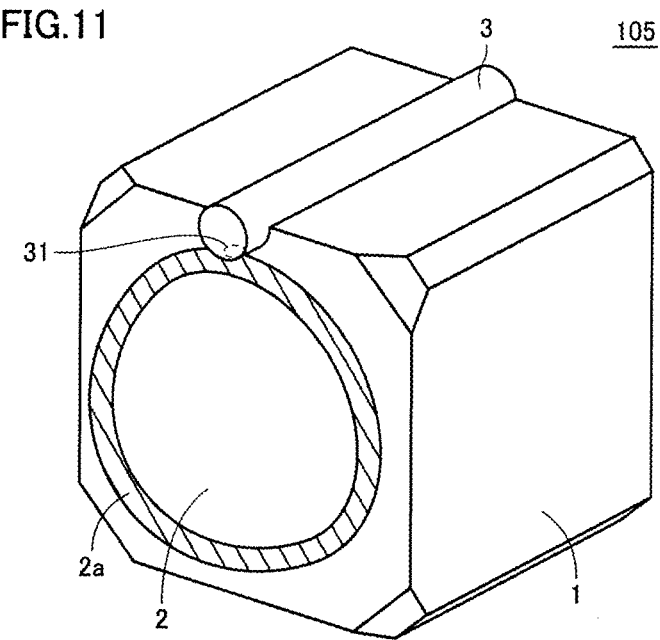
FIG. 11 is a perspective view of an imaging unit in which a hydrophilic region is provided on a light-transmissive member.

The imaging units according to the above preferred embodiments allow the cleaning liquid discharged onto an upper end of the protection cover 2 to flow along the edge of the protection cover 2 and to reach the lower end thereof. To facilitate the flow, a path via which the cleaning liquid preferentially flows may be provided by patterning a hydrophilic film on the surface of the protection cover. FIG. 11 is a perspective view of an imaging unit in which a hydrophilic region is provided on a light-transmissive member. Note that in an imaging unit 105 shown in FIG. 11, elements the same as or similar to those of the imaging unit 100 shown in FIG. 1 are denoted by the same reference symbols, and detailed descriptions thereof will be omitted.

The imaging unit 105 includes a hydrophilic region 2a provided on a peripheral portion of the protection cover 2 by patterning a hydrophilic film thereon. Note that a region on the protection cover 2 other than the hydrophilic region 2a is a hydrophobic region. The cleaning liquid is an aqueous solution so that it is able to flow on the hydrophilic region 2a preferentially. The cleaning liquid discharged onto the upper end of the protection cover 2 flows along the hydrophilic region 2a and reaches a lower end thereof easily.

In the imaging units according to the above preferred embodiments, the cleaning nozzle 3 is stationary as shown in FIG. 1. However, the cavity 31 of the cleaning nozzle 3 may be movable. More specifically, the cleaning nozzle 3 may move the cavity 31 around the visual field of the protection cover 2. Accordingly, the cleaning liquid is able to be reliably discharged to positions around the visual field of the protection cover 2.

In the imaging units according to the above preferred embodiments, the protection cover 2 shown in FIG. 1 has been described as an example of a light-transmissive member. However, the light-transmissive member may be a lens, a cover glass, or the like, provided in the imaging section insofar as the light-transmissive member covers the imaging range of the imaging section.

The imaging units according to the above preferred embodiments have been described as including a single cleaning nozzle 3 connected to the guide portion 10 as shown in FIG. 6. However, the imaging unit may include a plurality of cleaning nozzles 3 connected to the guide portion 10.

The imaging units according to the above preferred embodiments are not limited to the imaging units mounted on a vehicle and may be those implemented in conditions where the light-transmissive member provided in the visual field of the imaging device is to be cleaned.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cleaning device comprising:
    a holder section configured to hold an imaging device;
    a light-transmissive member configured to be provided in a visual field of the imaging device;
    a vibrator section that vibrates the light-transmissive member; and
    a discharge section that discharges a cleaning liquid; wherein
    the discharge section is configured to discharge the cleaning liquid such that the cleaning liquid reaches a surface of a side of the light-transmissive member that is opposite to a side thereof adjacent to or in a vicinity of the imaging device; and
    the vibrator section is configured to vibrate the light-transmissive member such that a portion of the surface of the light-transmissive member exhibits an amount of displacement larger than that of a portion of the surface of the light-transmissive member that the discharged cleaning liquid has reached.

2. The cleaning device according to claim 1, wherein the discharge section includes at least one cavity that discharges the cleaning liquid at a position outside of the visual field.

3. The cleaning device according to claim 2, wherein the at least one cavity included in the discharge section includes a plurality of cavities.

4. The cleaning device according to claim 3, wherein one of the plurality of cavities and corresponding another one of the plurality of cavities oppose each other with respect to a center of the light-transmissive member.

5. The cleaning device according to claim 3, wherein the plurality of cavities are equidistant or substantially equidistant with each other around the light-transmissive member.

6. The cleaning device according to claim 3, wherein a first spacing between a first adjacent pair of the plurality of cavities is different from a second spacing between a second adjacent pair of the plurality of cavities.

7. The cleaning device according to claim 3, wherein the plurality of cavities include openings that have different shapes.

8. The cleaning device according to claim 2, wherein the light-transmissive member includes a guide portion provided around the periphery thereof, and the at least one cavity is provided in the guide portion.

9. The cleaning device according to claim 2, wherein the discharge section moves the at least one cavity around the visual field of the light-transmissive member.

10. The cleaning device according to claim 1, wherein an optical axis of the imaging device passes through a portion of the surface of the light-transmissive member that exhibits a maximum or substantially maximum amount of displacement.

11. The cleaning device according to claim 1, wherein an optical axis of the imaging device passes through a portion of the surface of the light-transmissive member that does not exhibit a maximum or substantially maximum amount of displacement.

12. The cleaning device according to claim 1, wherein a maximum amount of displacement exhibited on the surface of the light-transmissive member is about 1 micrometer or more.

13. An imaging unit comprising:
the imaging device; and
the cleaning device according to claim 1.

14. The cleaning device according to claim 1, wherein the holder section has a square or substantially square tube shape or a cylinder shape.

15. The cleaning device according to claim 1, wherein the holder section is fixed to a base plate on an end of the holder section that is opposite to an end of the holder section adjacent to or in a vicinity of the vibrator section.

16. The cleaning device according to claim 1, wherein the vibrator section is a piezoelectric vibrator that includes two cylindrically shaped piezoelectric plates.

17. The cleaning device according to claim 1, wherein, according to the vibrator section vibrating the light-transmissive member, a center portion of the surface of the light-transmissive member exhibits an amount of displacement larger than that of a peripheral portion of the surface of the light-transmissive member.

18. The cleaning device according to claim 1, wherein the vibrator section vibrates the light-transmissive member in a respiratory vibration mode and in a longitudinal vibration mode.

19. The cleaning device according to claim 8, wherein the guide portion is an annularly shaped component and is fixed to the housing holder section.

20. The cleaning device according to claim 8, wherein the at least one cavity is provided in an inner circumferential surface of the guide portion.

* * * * *